(12) United States Patent
Li et al.

(10) Patent No.: US 8,352,263 B2
(45) Date of Patent: Jan. 8, 2013

(54) METHOD FOR SPEECH RECOGNITION ON ALL LANGUAGES AND FOR INPUTING WORDS USING SPEECH RECOGNITION

(76) Inventors: Tze-Fen Li, Taichung (TW); Tai-Jan Lee Li, Taichung (TW); Shih-Tzung Li, Taichung (TW); Shih-Hon Li, Taichung (TW); Li-Chuan Liao, Taichung (TW)

( * ) Notice: Subject to any disclaimer, the term of this patent is extended or adjusted under 35 U.S.C. 154(b) by 700 days.

(21) Appl. No.: 12/569,155

(22) Filed: Sep. 29, 2009

(65) Prior Publication Data

US 2011/0066434 A1 Mar. 17, 2011

(30) Foreign Application Priority Data

Sep. 17, 2009 (TW) ................................ 98131306 A (51) Int. Cl.
G10L 15/06 (2006.01)
G10L 15/02 (2006.01)
G10L 15/10 (2006.01)
G10L 15/00 (2006.01)

(52) U.S. Cl. ........ 704/243; 704/231; 704/236; 704/238; 704/244

(58) Field of Classification Search ................ 704/1–10, 704/219–220, 232–245, 246–250, 251–257, 704/E17.001–E17.016, E15.001–E15.05, 704/E11.001–E11.007
See application file for complete search history.

(56) References Cited

U.S. PATENT DOCUMENTS

| 5,271,088 | A | * | 12/1993 | Bahler | 704/200 |
|---|---|---|---|---|---|
| 5,345,536 | A | * | 9/1994 | Hoshimi et al. | 704/243 |
| 5,664,059 | A | * | 9/1997 | Zhao | 704/254 |
| 5,692,097 | A | * | 11/1997 | Yamada et al. | 704/241 |
| 5,704,004 | A | * | 12/1997 | Li et al. | 704/243 |
| 5,749,072 | A | * | 5/1998 | Mazurkiewicz et al. | 704/275 |
| 5,862,519 | A | * | 1/1999 | Sharma et al. | 704/231 |
| 5,893,058 | A | * | 4/1999 | Kosaka | 704/254 |
| 6,151,574 | A | * | 11/2000 | Lee et al. | 704/256 |
| 6,990,447 | B2 | * | 1/2006 | Attias et al. | 704/240 |
| 7,418,383 | B2 | * | 8/2008 | Droppo et al. | 704/236 |
| 7,643,989 | B2 | * | 1/2010 | Deng et al. | 704/209 |
| 8,145,483 | B2 | * | 3/2012 | Li et al. | 704/236 |
| 8,160,866 | B2 | * | 4/2012 | Li et al. | 704/8 |
| 2002/0173953 | A1 | * | 11/2002 | Frey et al. | 704/226 |
| 2003/0107592 | A1 | * | 6/2003 | Li et al. | 345/745 |
| 2003/0236663 | A1 | * | 12/2003 | Dimitrova et al. | 704/245 |
| 2004/0030556 | A1 | * | 2/2004 | Bennett | 704/270 |
| 2007/0129943 | A1 | * | 6/2007 | Lei et al. | 704/240 |
| 2008/0065380 | A1 | * | 3/2008 | Kwak et al. | 704/243 |
| 2009/0265159 | A1 | * | 10/2009 | Li et al. | 704/8 |
| 2011/0035216 | A1 | * | 2/2011 | Li et al. | 704/233 |
| 2011/0066434 | A1 | * | 3/2011 | Li et al. | 704/241 |

\* cited by examiner

*Primary Examiner* — Pierre-Louis Desir
*Assistant Examiner* — David Kovacek (57) ABSTRACT

The invention can recognize all languages and input words. It needs m unknown voices to represent m categories of known words with similar pronunciations. Words can be pronounced in any languages, dialects or accents. Each will be classified into one of m categories represented by its most similar unknown voice. When user pronounces a word, the invention finds its F most similar unknown voices. All words in F categories represented by F unknown voices will be arranged according to their pronunciation similarity and alphabetic letters. The pronounced word should be among the top words. Since we only find the F most similar unknown voices from m (=500) unknown voices and since the same word can be classified into several categories, our recognition method is stable for all users and can fast and accurately recognize all languages (English, Chinese and etc.) and input much more words without using samples.

4 Claims, 9 Drawing Sheets

| 且 | 七 | 勤 | 提 | 纖 | 撇 | 係 | 請 | 及 | 品 | 批 | 平 | 停 | 新 | 雄 |
|---|---|---|---|---|---|---|---|---|---|---|---|---|---|---|
| 14 | | 1 | 18 | 3 | 106 | 19 | 54 | 2 | | | | | | |

*14;10 一二三四五六七7*

| 一 | be | 第 | beef | 李 | 民 | 你 | with | 福 | you |
|---|---|---|---|---|---|---|---|---|---|
| 二 | bird | seven | 恩 | girl | brea | red | 省 | birth | listen |
| 三 | 讚 | 山 | 然 | 提 | 塞 | 站 | 滿 | 參 | have |
| 四 | 是 | 群 | 此 | 訊 | 學 | 吃 | two | 選 | 卻 |
| 五 | 怒 | 住 | 組 | 如 | blue | 用 | 輪 | 和 | 數 |
| 丟 | 六 | 廟 | beauti | 九 | 牛 | 熱 | you | 用 | 有 |
| 七 | sheep | 提 | 品 | 纖 | 性 | 且 | 勤 | 停 | 一 |

METHOD FOR SPEECH RECOGNITION ON ALL LANGUAGES AND FOR INPUTING WORDS USING SPEECH RECOGNITION

BACKGROUND OF THE INVENTION

1. Field of the Invention

Usually, words are input by typing. One needs a good skill to type and a good memory to exactly spell words. To input Chinese words, one needs exact pronunciation and a very good skill to type. There are several thousands of commonly used words. It is hard to use speech recognition methods to recognize a word and a sentence and input words. The present invention classifies a large number of commonly used known words into a small number of m(=about 500) categories represented by m unknown voices by using any languages, or dialects, even the pronunciation is incorrect. Each unknown voice represents a category of known words with similar pronunciation to the unknown voice. When a user pronounces a word, the invention uses the Bayes classifier to find the F most similar unknown voices. All known words from F categories represented by the F most similar unknown voices are arranged in a decreasing similarity according to their pronunciation similarity to the pronounced word and their alphabetic letters (or the number of strokes of a Chinese word). The user can easily and fast find the pronounced word. The invention does not exactly find the pronounced word from several thousands of words. It is impossible. The invention only finds the F most similar unknown voices from a small number of fixed m categories and hence the invention is able accurately and quickly to recognize and input a large amount of words. Furthermore, since m unknown voices are fixed and are independent of any languages, persons or sex, the speech recognition method is stable and can be easily used by all users.

The method includes 12 elastic frames of equal length without filter and without overlap to normalize the waveform of a word or an unknown voice to produce a 12×12 matrix of linear predict coding cepstra (LPCC), and hence the Bayesian pattern matching method can compare the equal-sized 12×12 matrices of LPCC between two words or unknown voices.

Since the same word can be pronounced in any language or in any accent, correct or incorrect, the same word is classified into several categories. Hence any person using any language and without knowing spelling or typing skill can easily use the invention to recognize a word and a sentence, and input a large amount of words.

This invention does not use any samples for any known words and is still able to recognize a sentence of any language correctly 2. Description of the Prior Art In the recent years, many speech recognition devices with limited capabilities are now available commercially. These devices are usually able to deal only with a small number of acoustically distinct words. The ability to converse freely with a machine still represents the most challenging topic in speech recognition research. The difficulties involved in speech recognition are:

(1) to extract linguistic information from an acoustic signal and discard extra linguistic information such as the identity of the speaker, his or her physiological and psychological states, and the acoustic environment (noise), (2) to normalize an utterance which is characterized by a sequence of feature vectors that is considered to be a time-varying, nonlinear response system, especially for an English words which consist of a variable number of syllables, (3) to meet real-time requirement since prevailing recognition techniques need an extreme amount of computation, and (4) to find a simple model to represent a speech waveform since the duration of waveform changes every time with nonlinear expansion and contraction and since the durations of the whole sequence of feature vectors and durations of stable parts are different every time, even if the same speaker utters the same words or syllables.

These tasks are quite complex and would generally take considerable amount of computing time to accomplish. Since for an automatic speech recognition system to be practically useful, these tasks must be performed in a real time basis. The requirement of extra computer processing time may often limit the development of a real-time computerized speech recognition system.

A speech recognition system basically contains extraction of a sequence of feature for a word, normalization of the sequence of features such that the same words have their same feature at the same time position and different words have their different own features at the same time position, segmentation of a sentence or name into a set of D words and selection of a matching sentence or name from a database to be the sentence or name pronounced by a user.

The measurements made on speech waveform include energy, zero crossings, extreme count, formants, linear predict coding cepstra (LPCC) and Mel frequency cepstrum coefficient (MFCC). The LPCC and the MFCC are most commonly used in most of speech recognition systems. Furthermore, the existing recognition systems are not able to identify any language in a fast or slow speech, which limits the recognition applicability and reliability of their systems.

Therefore, there is a need to find a speech recognition system, which can naturally and theoretically produce an equal-sized sequence of feature vectors to well represent the nonlinear time-varying waveform of a word so that each feature vector in the time sequence will be the same for the same words and will be different for different words, which provides a faster processing time, which does not have any arbitrary, artificial or experimental thresholds or parameters and which has an ability to identify the words in a fast and slow utterance in order to extend its recognition applicability. The most important is that the speech recognition system must be very accurate to identify a word or a sentence in all languages.

Up to now, there is no speech recognition system to input a large number of words by speech recognition, because the existent speech recognition system is not good enough to identify a word or a sentence.

SUMMARY OF THE PRESENT INVENTION

It is therefore an object of the present invention to provide a method to overcome the aforementioned difficulties encountered in the prior art. The most important object of the present invention is to provide a stable method to classify and input a large number of words by restricting classification on a small number (m) of unknown voices. The second object of the present invention is to provide a method to recognize all languages no matters how you pronounce a word, correctly and incorrectly with local dialects or special accents. Third object of the present invention is to provide a method for any person to easily use the invention to recognize and input a word in any language by putting the same word into several categories. The fourth object of the present invention is to provide a fixed number E of elastic frames of equal length without filter and without overlap to normalize the waveform of variable length of a word to produce an equal-sized matrix of features to represent a word such that the same words have the same feature at the same time position and different words have their different features in the same time position in the matrix. The fifth object of the present invention is to provide a Bayesian decision classifier which gives the minimum probability of misclassification. The sixth object of the present invention is to provide a modification technique to relocate a word into a proper category such that the word is to be identified. The present invention has the following advantages:

(1) The pattern recognition system is naturally and theoretically derived based on the nonlinear time-varying waveforms without any arbitrary or experimental parameters or thresholds in order to improve recognition ability.

(2) The uniform segmentation on the whole waveform of a word with E equal elastic frames without filter and without overlap can use the same j-th elastic frame, $j=1, \ldots, E$, to catch in time order the same feature for the same words and different features for the different words.

(3) The pattern recognition system can immediately classify an unknown word after extraction of the feature by E equal elastic frames without further compressing or warping or adjusting the length of the sequence of features since the features are already pulled to the same time position.

(4) Since E equal elastic frames do not overlap over each other, less number of frames can cover the whole waveform of a word and save computation time both in extracting features and recognition.

(5) E equal elastic frames segment the whole waveform of a word and can stretch and contract themselves to cover the whole speech waveform to produce an equal-sized matrix of features and hence the present invention can recognize a word with a variable length of waveform (with one to several syllables) with too short or too long speech waveform in a fast or slow speech.

(6) The whole algorithm to extract feature and to classify an unknown word is simple and time-saving.

(7) The main technique in the present invention is to find only the F most similar unknown voices from m unknown voices and from the F categories of known words represented by the F most similar unknown voices, find the pronounced word. It does not identify the particularly pronounced word from several thousands of known words. Hence the speech recognition method is stable for any person to use any language and it can still fast and accurately recognize and input a large number of words.

(8) A word can be pronounced, correct or incorrect, in any language or in any accent or any dialect, and hence the same word is classified into several categories of known words. Therefore, any person can use the present invention to recognize and input a large number of words no matters how to pronounce a word or a sentence in any language.

(9) The present invention provides a segmentation skill to segment a sentence or name into a set of D pronounced words and a screening window to select a matching sentence or name from the sentence and name database to be a sentence or name uttered by a speaker.

(10) Another technique in the present invention is to provide skills to modify and relocate words in a sentence into their proper categories such that the sentence can be correctly recognized.

(11) Finally, the present invention does not use any samples for known words.

BRIEF DESCRIPTION OF THE DRAWINGS

A word contains one to several syllables. A Chinese syllable is a word with one syllable. An unknown voice is a pronunciation of an unknown word.

DETAILED DESCRIPTION OF THE PREFERRED EMBODIMENT

Figure 1:
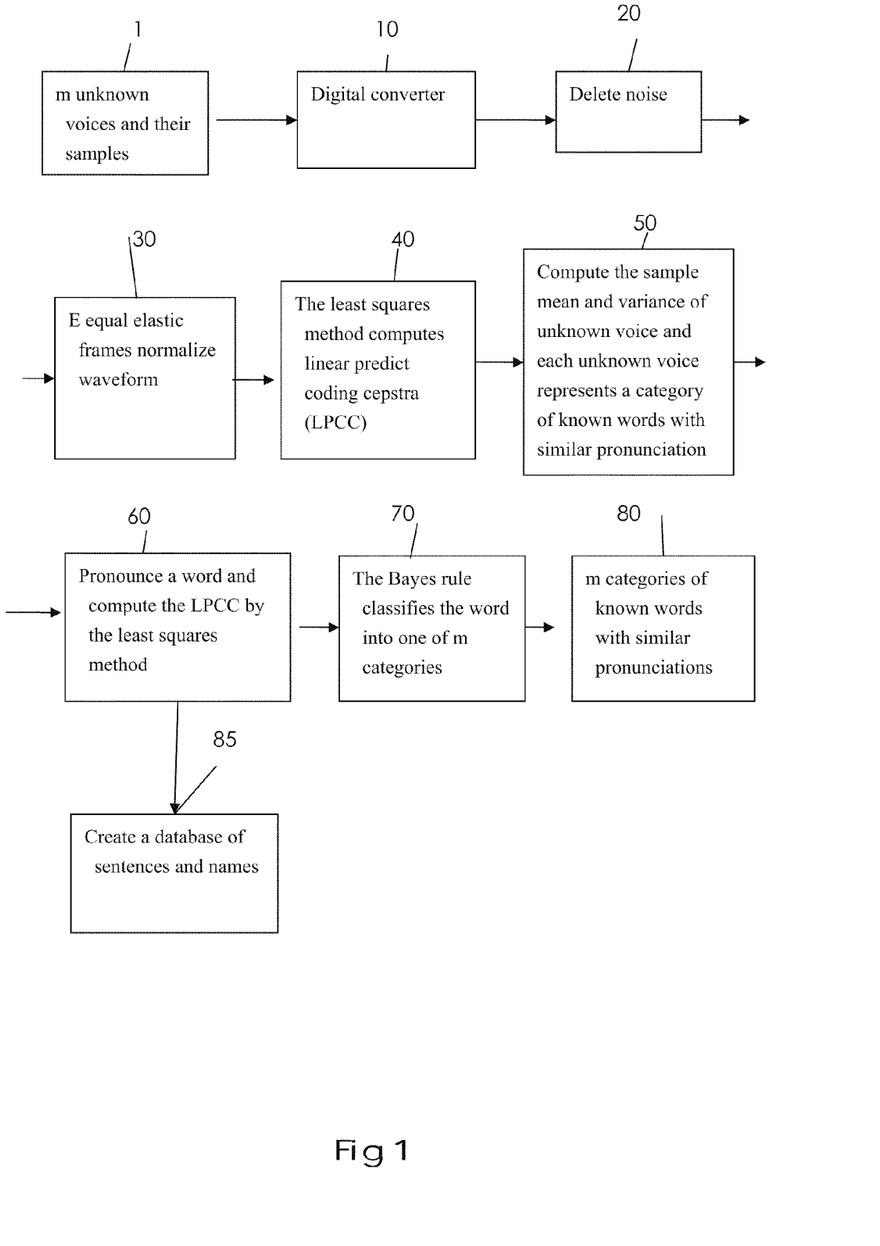
FIG. 1 is a flow-chart diagram to build m databases of known words with similar pronunciations represented by m unknown voices and a sentence and name database made of known words.

A word has one to several syllables and a Chinese syllable is also a word with one syllable. A voice is a pronunciation of a word. In FIG. 1, the invention needs m unknown voices 1. Each unknown voice has samples and each unknown voice represents a category of known words which have the most similar pronunciation to the unknown voice. The invention also needs a sentence and name database. Digital converter 10 converts the waveform of each unknown voice or a word into a series of digital sampled signal points. A preprocessor 20 receives the series of digital signals from the digital converter 10 to delete the noise and the time intervals which do not have speech digital signals. After deletion of noise, then the total length of the new waveform denoting the voice or the word is uniformly partitioned into E equal segments by E equal elastic frames (windows) 30 without filter and without overlap. Since the length of each equal frame is proportional to the total length of the waveform denoting the voice or the word, the E frames are called the elastic frames which can stretch and contract themselves to cover the whole waveforms of variable length for the voice or the word. Each unknown voice or each word has the same number E of equal elastic frames without filter and without overlap to cover its waveform, i.e., a voice (or a word) with a short waveform has less sampled points in a frame and a voice (or a word) with a long waveform has more sampled points in a frame. For the waveforms of various lengths denoting the same voice (or the same word), the sampled points both in a short frame and in a long frame carry the same amount of same feature information if they are recognized as the same voice (word) by human ears. The E frames are plain and elastic without Hamming or any other filter and without overlap, contracting themselves to cover the short voice (word) waveform produced by the short pronunciation of a voice (word) and stretching themselves to cover the long waveform produced by long pronunciation of a voice (word) without the need of deleting or compressing or warping the sampled points or feature vectors as in the dynamic time-warping matching process and in the existent pattern recognition systems. After uniform segmentation processing on waveform with E equal elastic frames 30 without filter and without overlap to cover the waveform, the sampled points in each frame are used to compute 40 the least squares estimates of regression coefficients, since a sampled point of voice waveform is linearly dependent of the past sampled points by the paper of Makhoul, John, Linear Prediction: A tutorial review, Proceedings of IEEE, 63(4) (1975). The least squares estimates in a frame are called the linear predict coding coefficients (a LPC vector) having normal distributions, which are then converted into a more stable LPC cepstra (a LPCC vector of dimension P). A voice or a word is represented by a E×P matrix of LPCC 40. Compute the sample mean and variance of LPCC for each unknown voice. The E×P matrix of sample means and variances of LPCC denotes an unknown voice and each unknown voice represents a category of known words with similar pronunciation to the unknown voice 50. There are m categories for all known words. To classify a known word into a category, the known word is pronounced by a speaker with standard and clear pronunciation. If the user speaks a different language or dialect or with a serious accent, then let the user pronounce the known word. The pronunciation of the word is transformed into a E×P matrix of linear predict coding cepstra by the least squares method 60. Then the Bayes rule compares the matrix of sample means of each unknown voice with the matrix of LPCC of the pronounced word, weighted by the sample variances of the unknown voice to compute the Bayesian distance (called the Bayesian similarity, or similarity). Among m unknown voices, find the most similar unknown voice with the least Bayesian distance to the pronounced word and the pronounced word is classified into the category of known words denoted by the most similar unknown voice to the known word 70. There are m categories of known words with similar pronunciations 80 (each category of known words has a similar pronunciation with its unknown voice). From the known words, a sentence and name database is created 85.

Figure 2:
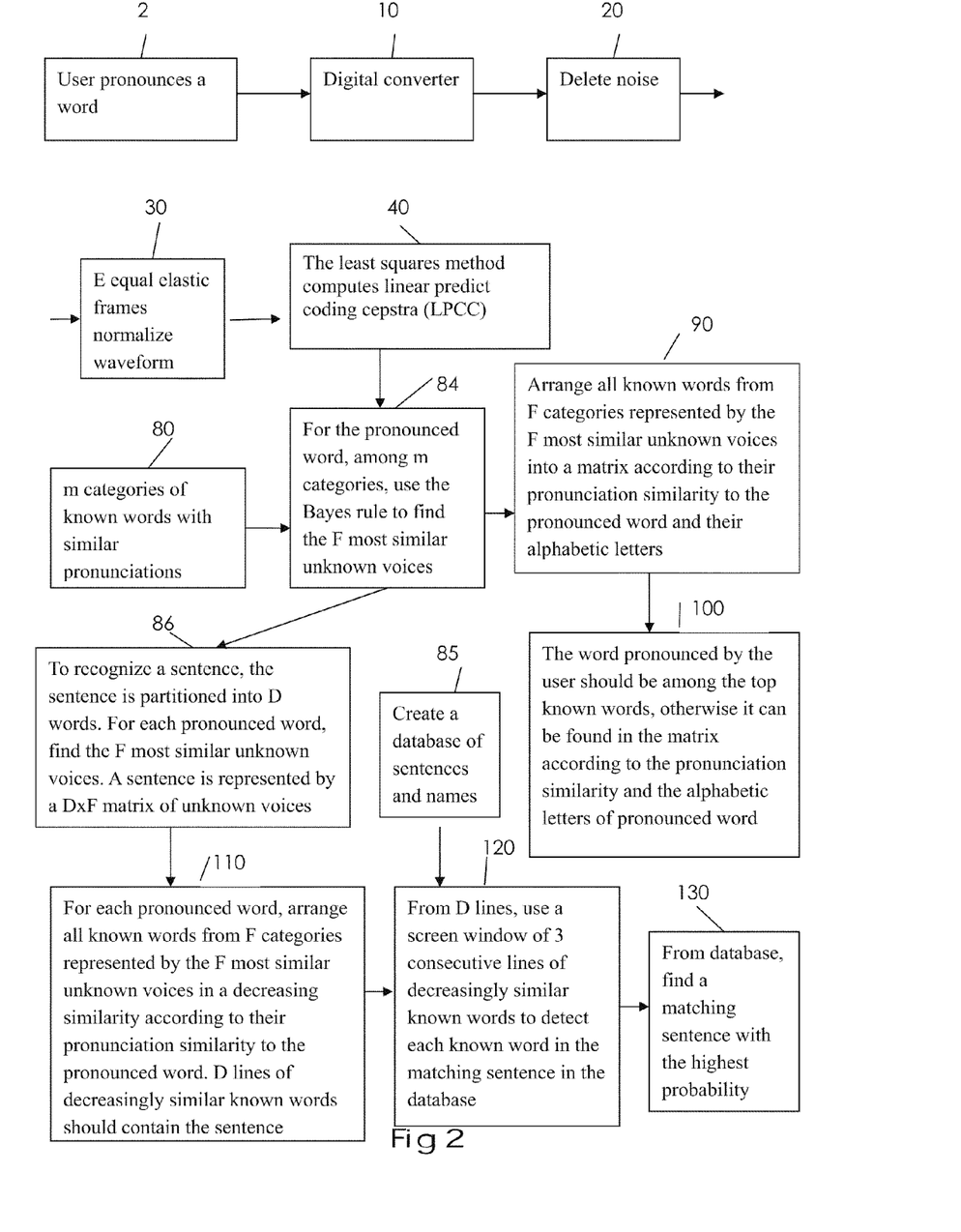
FIG. 2 is the flow-chart diagram showing the processing steps of speech recognition on words and sentences and names and the input of words.

In FIG. 2, the invention recognizes a word and a sentence and name and inputs a word. A user pronounces a word 2. Digital converter converts the waveform of the word into a series of digital signal points 10 and the preprocessor deletes noise 20. E equal elastic frames without filter and without overlap normalize the whole waveform (the series of digital signal points without noise) of the pronounced word 30. The least squares method computes the E×P matrix of linear predict coding cepstra (LPCC) for the pronounced word 40. The Bayesian classifier compares the matrix of sample means of each unknown voice with the matrix of LPCC of the pronounced word, weighted by its sample variances to find the Bayesian distance (similarity) between the unknown voice and the pronounced word. Among m unknown voices, the Bayesian classifier finds the F most unknown voices by the least F Bayesian distances to the pronounced word 84. All known words from F categories of known words represented by the F most similar unknown words are arranged in a decreasing similarity according to their (absolute) distances between the matrices of LPCC of the known words and the matrix of LPCC of the pronounced word, also called pronunciation similarity between the known words in F categories and the pronounced word 90. Since all words have no sample variances, the invention can not use the Bayesian distance. The pronounced word (pronounced by the user) should be among the several top words (left-handed side). Otherwise all known words from F categories in a decreasing similarity are partitioned into several equal segments. Each segment of known words are arranged in a line according to their alphabetic letters (or the number of strokes in Chinese) of the known words in the same segment, i.e., all known words in F categories are arranged into a matrix according to their pronunciation similarity to the pronounced word and their alphabetic letters (or the number of strokes in Chinese) 90. The word pronounced by the user can be easily found in the matrix of known words according to the (absolute) distance (pronunciation similarity) and the alphabetic letters (the number of strokes) of the pronounced word 100. To identify a sentence or name, the invention first partitions the sentence or name into D pronounced words. Each pronounced word is transformed into a E×P matrix of linear predict coding cepstra. For each pronounced word, the Bayesian classifier finds its F most similar unknown voices among m unknown voices using the F least Bayesian distances. A sentence or name is represented by a D×F matrix of unknown voices 86. For each pronounced word, arrange all known words in F categories represented by its F most similar unknown voices in a decreasing similarity according to the (absolute) distances (pronunciation similarity) of their matrices of LPCC to that of the pronounced word. D lines of decreasingly similar known words should contain the pronounced sentence or name 110. From D lines of decreasingly similar known words, the invention uses a window of 3 consecutive lines of decreasingly similar known words to detect each known word in the matching sentence or name in the sentence and name database 120. From the database, find a matching sentence or name with the highest probability to be the sentence or name uttered by the user 130. The invention provides a skill to correctly identify an unsuccessful word, sentence or name and input unsuccessful words, i.e., if a pronounced word is not identified, the invention relocates the word into its proper category in order to be identified correctly.

As follows is the detailed description of the present invention:

1. The invention needs m unknown voices, each having samples 1. After an unknown voice (or a word) inputs, the pronunciation of the unknown voice is transformed into a series of signal sampled points 10. Then delete noise 20 and the signal sampled points which do not have real speech signals. The invention provides two methods. One is to compute the sample variance in a small segment of sampled points. If the sample variance is less than that of noise, delete the segment. Another is to calculate the total sum of absolute distances between two consecutive points in a small segment. If the total sum is less than that of noise, delete the segment. From experiments, two methods give about the same recognition rate, but the latter is simple and time-saving.

2. After delete the sampled points which do not have speech signal, the whole series of sampled points are partitioned into a fixed number E of equal segments, i.e., each segment contains the same number of sampled points. E equal segments form E windows without filters and without overlaps. E equal segments are called E equal elastic frames since they can freely contract or expand themselves to cover the whole speech waveform of the unknown voice (or a word). The number of the sampled points in an elastic frame is proportional to the total points of a speech waveform. The same voice (word) can be uttered in variable lengths of speech waveforms by the same or different speakers. For the same voices (words), a small number of sampled points in the j-th short frame of a short speech waveform carry the same amount of the same feature information as a large number of sampled points in the j-th long frame of a long speech waveform if they can be recognized as the same word by human ears. From experiments, E=12 gives a better recognition rate.

3. In each segment of signal sampled points, the invention extracts the feature for the voice (word). Since in the paper of Markhoul, John, Linear Prediction: A Tutorial Review, Proceedings of the IEEE, 63(4), 1975, the sampled signal point S(n) can be linearly predicted from the past P sampled points, a linear approximation S'(n) of S(n) can be formulated as:

$$S'(n) = \sum_{k=1}^{P} a_k S(n-k), \quad n \geq 0 \quad \text{EQN<1>}$$

where P is the number of the past samples and the least squares estimates $a_k$, k=1, . . . , P, are generally referred to be the linear predict coding coefficients (a LPC vector) which have normal distributions. The LPC method (the least squares method) provides a robust, reliable and accurate method for estimating the linear regression parameters that characterize the linear, time-varying regression system which is used to approximate the nonlinear, time-varying system of the speech waveform of a voice (word). Hence, in order to have a good estimation of the nonlinear time-varying system by the linear regression models, the invention uses a uniform segmentation on the speech waveforms. Each equal segment is called an elastic frame 30. There are E equal elastic frames without filter and without overlap which can freely contract or expand themselves to cover the whole speech waveform of the voice (word). E equal elastic frames can produce in time order the same LPC feature vectors (the least squares estimates, which have normal distributions) by the least squares method 40 for the same voices (words) which have various lengths of speech waveforms, even uttered by the same speaker. All signal sampled points are not filtered. The number of the sampled points in a frame is proportional to the total points of a speech waveform. The same voice (word) can be uttered in variable lengths of speech waveforms by the same or different speakers. For the same voices (words), a small number of sampled points in the j-th short frame of a short speech waveform carry the same amount of the same feature information as a large number of sampled points in the j-th long frame of a long speech waveform if they can be recognized as the same voice (word) by human ears. From experiments, E=12 gives a better recognition rate. Let $E_1$ be the squared difference between S(n) and S'(n) over N+1 samples of S(n), n=0, 1, 2, ..., N, where N is the number of sampled points in a frame proportional to the length of a whole speech waveform denoting a word, i.e., let the least squares estimates $a_k$, k=1, ..., P, denote the linear predict coding coefficients (a LPC vector), then $$E_1 = \sum_{n=0}^{N}\left[S(n) - \sum_{k=1}^{P} a_k S(n-k)\right]^2 \quad \text{EQN<2>}$$

To minimize $E_1$, taking the partial derivative for each i=1, ..., P on the right side of (2) and equating it to zero, we obtain the set of normal equations:

$$\sum_{k=1}^{P} a_k \sum_n S(n-k)S(n-i) = \sum_n S(n)S(n-i), \quad 1 \le i \le P \quad \text{EQN<3>}$$

Expanding (2) and substituting (3), the minimum total squared error, denoted by $E_P$ is shown to be $$E_P = \sum_n S^2(n) - \sum_{k=1}^{P} a_k \sum_n S(n)S(n-k) \quad \text{EQN<4>}$$

Eq (3) and Eq (4) then reduce to $$\sum_{k=1}^{P} a_k R(i-k) = R(i), \quad 1 \le i \le P \quad \text{EQN<5>}$$

$$E_P = R(0) - \sum_{k=1}^{P} a_k R(k) \quad \text{EQN<6>}$$

respectively, where $$R(i) = \sum_{n=0}^{N-i} S(n)S(n+i), \quad i \ge 0 \quad \text{EQN<7>}$$

Durbin's recursive procedure in the book of Rabiner, L. and Juang, Biing-Hwang, Fundamentals of Speech Recognition, Prentice Hall PTR, Englewood Cliffs, N.J., 1993, can be specified as follows:

$$E_0 = R(0) \quad \text{EQN<8>}$$

$$k_i = \left[R(i) - \sum_{j=1}^{i-1} a_j^{(i-1)} R(i-j)\right] / E_{i-1} \quad \text{EQN<9>}$$

$$a_i^{(i)} = k_i \quad \text{EQN<10>}$$

$$a_j^{(i)} = a_j^{(i-1)} - k_i a_{i-j}^{(i-1)}, \quad 1 \le j \le i-1 \quad \text{EQN<11>}$$

$$E_i = (1 - k_i^2) E_{i-1} \quad \text{EQN<12>}$$

Eq (8)-(12) are solved recursively for i=1, 2, ..., P. The final solution (LPC coefficient or least squares estimate) is given by $$a_j = a_j^{(P)}, \quad 1 \le j \le P \quad \text{EQN<13>}$$

The LPC coefficients are then transformed into the stable cepstra (LPCC) 60 $\hat{a}_i$, i=1, ... m, P, in Rabiner and Juang's book, by $$\hat{a}_i = a_i + \sum_{j=1}^{i-1} \left(\frac{j}{i}\right) a_{i-j} \hat{a}_j, \quad 1 \le i \le P \quad \text{EQN<14>}$$

$$\hat{a}_i = \sum_{j=i-P}^{i-1} \left(\frac{j}{i}\right) a_{i-j} \hat{a}_j, \quad P < i \quad \text{EQN<15>}$$

Here in our experiments, P=12, because the cepstra in the last few elements are almost zeros. The whole waveform of the voice (word) is transformed into a E×P matrix of LPCC, i.e., a word or a voice is denoted by a E×P matrix of linear predict coding cepstra.

4. All samples of an unknown voice are transformed into E×P matrices of LPCC. Find the sample mean and variance of LPCC of the unknown voice. The E×P matrix of sample means and variances represents the unknown voice. An unknown voice represents a category of known words with pronunciation similar to the unknown voice 50. All known words are pronounced 60 by a speaker with standard and clear utterance (if the user speaks different language or different dialect or with special accents, let the user pronounce the words) and classified by the Bayesian classifier 70 into m categories with similar pronunciations 80. From the known words in m categories, the invention builds a sentence and name database 85.

5. In FIG. 2, the invention recognizes and inputs a word. After a user pronounces a word 2, converts its waveform into a series of sampled points 10 and delete noise 20. Use the E equal elastic frames without filter and without overlap 30 and Durbin's recursive formula (8-15) of the least squares method to compute an equal-sized E×P matrix of LPCC of the pronounced word 40.

6. The speech processor 84 now receives the E LPCC vectors (a E×P matrix of LPCC) denoting the pronounced word, represented by X=(X$_1$, ..., X$_E$), with X$_j$ denoting the j-th vector of P LPCC X$_j$=(X$_{j1}$, ..., X$_{jP}$) computed from sampled points of the speech waveform in the j-th equal elastic frame by the least squares method. The E feature vectors (X$_1$, ..., X$_E$) is a E×P matrix of LPCC X={X$_{jl}$}, j=1, ..., E, l=1, ..., P, where the random variables {X$_{jl}$} have normal distributions and E=P=12. The pronounced word X is classified to one of m categories of known words represented by the most similar unknown voices $\omega_i$, i=1, ..., m to the pronounced word X. The classification method is as follows: Consider the decision problem consisting of determining whether the unknown voice $\omega_i$ is the most similar unknown voice to the pronounced word X. Let $f(x|\omega_i)$ be the conditional density function of X of the pronounced word given the unknown voice $\omega_i$. Let $\theta_i$ be the prior probability of $\omega_i$ such that $\Sigma_{i=1}^{m}\theta_i=1$, i.e., the $\theta_i$ is the probability for the unknown voice $\omega_i$ to occur. Let d be a decision rule and d(X) denotes the most similar unknown voice to X. A simple loss function L($\omega_i$, d(x)), i=1, ..., m, is used such that the loss L($\omega_i$, d(x))=1 when d(x)≠$\omega_i$ makes a wrong decision and the loss L($\omega_i$, d(x))=0 when d(x)=$\omega_i$ makes a right decision. Let $\tau$=($\theta_1$, ..., $\theta_m$) and let R($\theta$, d) denote the risk function (the probability of misclassification) of d. Let $\Gamma_i$, i=1, ..., m, be m regions separated by d in the E×P-dimensional domain of X, i.e., d decides $\omega_i$ when X∈$\Gamma_i$. Then the minimum probability of misclassification is $$R(\tau, d) = \sum_{i=1}^{m} \theta_i \int L(\omega_i, d(x)) f(x|\omega_i) dx \quad \text{EQN<16>}$$
$$= \sum_{i=1}^{m} \theta_i \int_{\Gamma_i^c} f(x|\omega_i) dx$$

where $\Gamma_i^c$ is the complement of $\Gamma_i$. Let D be the family of all decision rules which separate m regions. Let the minimum probability of misclassification be denoted by $$R(\tau, d_\tau) = \min_{d \in D} R(\tau, d) \quad \text{EQN<17>}$$

A decision rule $d_\tau$ which satisfies (17) is called the Bayes decision rule with respect to the prior distribution $\tau$ and can be represented as:

$$d_\tau(x) = \omega_i \text{ if } \theta_i f(x|\omega_i) > \theta_j f(x|\omega_j) \quad \text{EQN<18>}$$

for all j≠i, i.e., $\Gamma_i$={x|$\theta_i$f(x|$\omega_i$)>$\theta_j$f(x|$\omega_j$)} for all j≠i.

The E×P feature values of the E×P matrix of LPCC denoted by X={X$_{jl}$}, j=1, ..., E, l=1, ... P, denoting the pronounced word are assumed to have independent normal distributions for simplicity. The conditional normal density of x={x$_{jl}$} given the unknown voice $\omega_i$ can be represented as $$f(x|\omega_i) = \left[\prod_{jl} \frac{1}{\sqrt{2\pi}\,\sigma_{ijl}}\right] e^{-\frac{1}{2}\sum_{jl}\left(\frac{x_{jl}-\mu_{ijl}}{\sigma_{ijl}}\right)^2} \quad \text{EQN<19>}$$

where i=1, ..., m and ($\mu_{ijl}$, $\sigma_{ijl}^2$) are the matrix of means and variances of the pronounced word X. Taking logarithm on both sides of (19), the Bayes decision rule (18) with equal prior on each word becomes $$l(\omega_i) = \sum_{jl} \ln(\sigma_{ijl}) + \frac{1}{2}\sum_{jl}\left(\frac{x_{jl}-\mu_{ijl}}{\sigma_{ijl}}\right)^2, \quad i=1, \ldots, m. \quad \text{EQN<20>}$$

In (20), the value $l(\omega_i)$ means the difference between the LPCC x$_{jl}$ of the pronounced word and the means $\mu_{ijl}$ weighted by the variances $\sigma_{ijl}^2$, where ($\mu_{ijl}$, $\sigma_{ijl}^2$) are estimated by the matrix of sample means and variances of the unknown voice $\omega_i$. The value $l(\omega_i)$ is also called the Bayesian classifier or Bayesian distance (similarity) between the pronounced word X and the unknown voice $\omega_i$ (small Bayesian distance means large similarity).

7. All known words are pronounced by a speaker with standard and clear pronunciation. If a user uses other language or has special accent, then the known words are pronounced by the user. All pronounced words are transformed into E×P matrices of linear predict coding cepstra (LPCC) 60. The Bayesian classifier compares the E×P matrix of LPCC of a pronounced word and the E×P matrix of sample means, weighted by the variances of each unknown voice to calculate the Bayesian distance (similarity) (20). The Bayesian classifier finds the most similar unknown voice with the least Bayesian distance to the pronounced word. The pronounced word is classified into the category of known words represented by the most similar unknown voice to the pronounced word 70. All pronounced words are classified into m categories of known words with similar pronunciations to their most similar unknown voices 80.

8. A user pronounces a word 2. A digital converter transforms the waveform of the pronounced word into a series of digital signal sampled points 10 and a pre-processor deletes noise 20. The series of signal sampled points of the pronounced word is normalized 30 by E equal elastic frames and is transformed into a E×P matrix of LPCC by the least squares method 40. The Bayesian classifier finds the F most similar unknown voices for the pronounced word by using the F least Bayesian distances (20) to the pronounced word 84. All known words from F categories represented by the F most unknown voices are arranged in a decreasing similarity according to the (absolute) distance (also called pronunciation similarity) (the invention can not use the Bayesian distance because there is no variance for the known words and the pronounced word) between the matrix of LPCC of each known word in F categories and the matrix of LPCC of the pronounced word 90. The word pronounced by the user should be among the several top words 100 (the most left-handed side). Or all known words from F categories after arranged in a decreasing similarity are partitioned into several segments. All words in each segment are arranged by their alphabetic letters (or the number of strokes of a Chinese syllable), i.e., all known words from F categories are arranged by their pronunciation similarity (the distances between the known words and the pronounced word) and their alphabetic letters (or the number of strokes in Chinese) into a matrix of known words 90. After a user pronounces a word, the user is easily able to find the pronounced word from the matrix by using the pronunciation similarity and the alphabetic letters of the word pronounced by the user 100.

9. A user speaks a sentence or a name and the sentence or name is partitioned into D pronounced words. For each pronounced word, the Bayesian classifier (20) finds the F most similar unknown voices. A sentence or a name is represented by D×F matrix of unknown voices 86. For pronounced word, arrange all known words from F categories represented by its F most similar unknown voices in a decreasing similarity in a line according to their pronunciation similarity (absolute distances between the known words and the pronounced word). D lines of decreasingly similar known words should contain the sentence or name uttered by the user 110. The following details the speech recognition on a sentence or name:

(a) A sentence or name is represented by a long sequence of speech sampled points. In a unit time interval, we first compute total sum of distances between two consecutive points. If the total sum is less than the total sum of noise, the unit interval does not have speech signal. If the unit time intervals without speech signal are accumulated to a certain amount (more than the time between two syllables in a word), it must be a border line between two pronounced words (a Chinese syllable is considered as a word with one syllable). The sentence or name is partitioned into D pronounced words.

(b) In the sentence and name database, find the sentence or name uttered by a speaker. Since a pronounced word may be partitioned into two words, in the sentence and name database, pick up the matching sentences or names with D−1, D and D+1 known words for matching the sentence or name uttered by the user.

(c) To each of D pronounced words, find its F most similar unknown voices using the Bayesian classifier (20). The F E×P matrices of means and variances of F unknown voices have the F shortest Bayesian distances to the E×P matrix of LPCC of the pronounced word. A sentence or name is represented by a D×F matrix of unknown voices 86.

(d) for each pronounced word, arrange all known words from F categories represented by its F most similar unknown voices in a decreasing similarity according to their (absolute) distances of matrices of LPCC to the matrix of LPCC of the pronounced word. There are D lines of decreasingly similar known words which should contain the sentence or name uttered by the user;

(e) If a matching sentence or name in the sentence and name database 85 has exact D known words, then match each known word of the matching sentence or name with each line of decreasingly similar known words of D lines in the row order from the first row to the last one. If each row of the decreasingly similar known words contains its corresponding known word of the matching sentence or name, there are a number of D pronounced words recognized correctly. Hence the matching sentence or name is the sentence or name uttered by the speaker.

(f) If a matching sentence or name in the sentence and name database 85 does not have the exact number of D known words or in (e), at least one line of decreasingly similar known words does not have a known word of the matching sentence or name, the invention uses a screen window of 3 consecutive lines of decreasingly similar known words to find the sentence or name. The (i−1)-th, i-th and (i+1)-th lines of decreasingly similar known words in the screen window checks the i-th known word of the matching sentence or name 120 and compute the probability (the number of known words of the matching sentence or name in the screen window divided by total number of known words in the matching sentence or name). The invention selects a matching sentence or name in the sentence and name database 85 with the highest probability to be the sentence or name uttered by the user 130.

10. The invention provides a skill to help recognize unsuccessful words, unsuccessful sentences or names and help input unsuccessful words correctly:

(a) If a pronounced word can not be identified from F categories represented by its F most unknown voices, it must be in the other category or it is not in any of m categories. The user pronounces the word again. The Bayesian classifier finds its most similar unknown voice and then the unsuccessful word is relocated to the category represented by the most similar unknown voice.

(b) If a pronounced word is not in all m categories, the user pronounces the new word again. The Bayesian classifier finds its most similar unknown voice. The new word is added into the category represented by its most similar unknown voice.

(c) If a sentence or a name is not successfully recognized, the user utters the whole sentence or name again. The sentence or name is partitioned into pronounced words. For each pronounced word, the Bayesian classifier finds the most similar unknown voice and the pronounced word is relocated to the category represented by its most similar unknown voice. The sentence or name after uttered by the user will be recognized.

(d) The invention only relocates unsuccessful words into another categories. It does not change any features (sample means and variances) of m unknown voices. The sample means and variances of m unknown voices are considered to be constants, which are independent of languages, accents, persons and sex. Hence the recognition method of the invention is stable for any users and can recognize and input a large number of words.

11. For the same word, a user can use any language (English, Chinese, Japanese, German and etc), or any accent or any dialect to pronounce, even to pronounce incorrectly or completely wrong. The Bayesian classifier classifies the same word into several categories. Hence the invention can be easily used by any user to recognize and input a word and a sentence.

Figure 3:
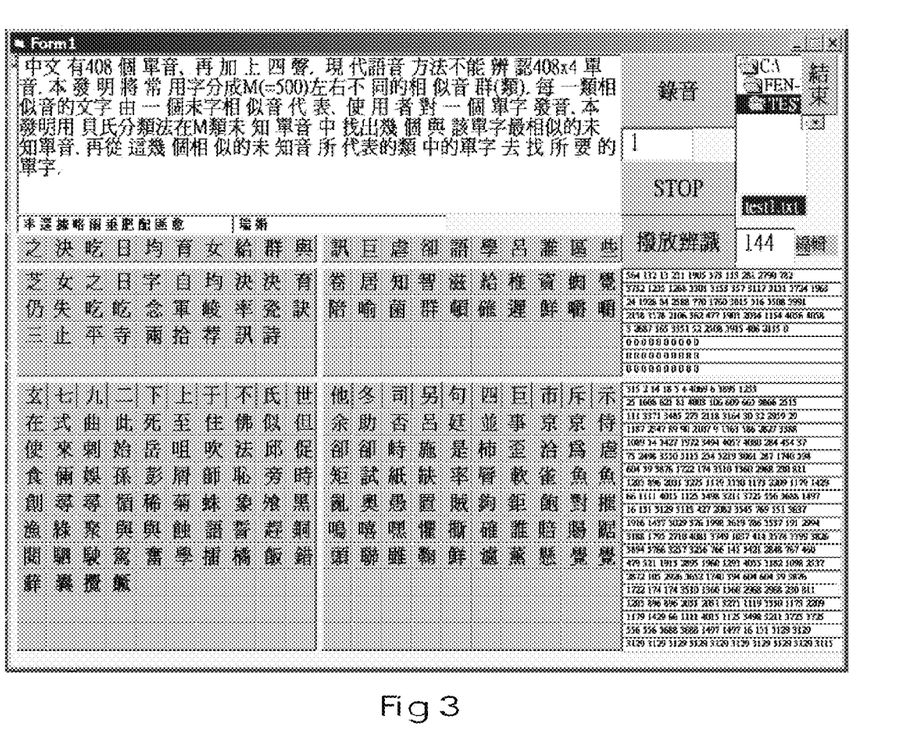
FIGS. 3-4 shows that the invention inputs the whole book of the present invention in Chinese version except mathematical formula.
Figure 4:
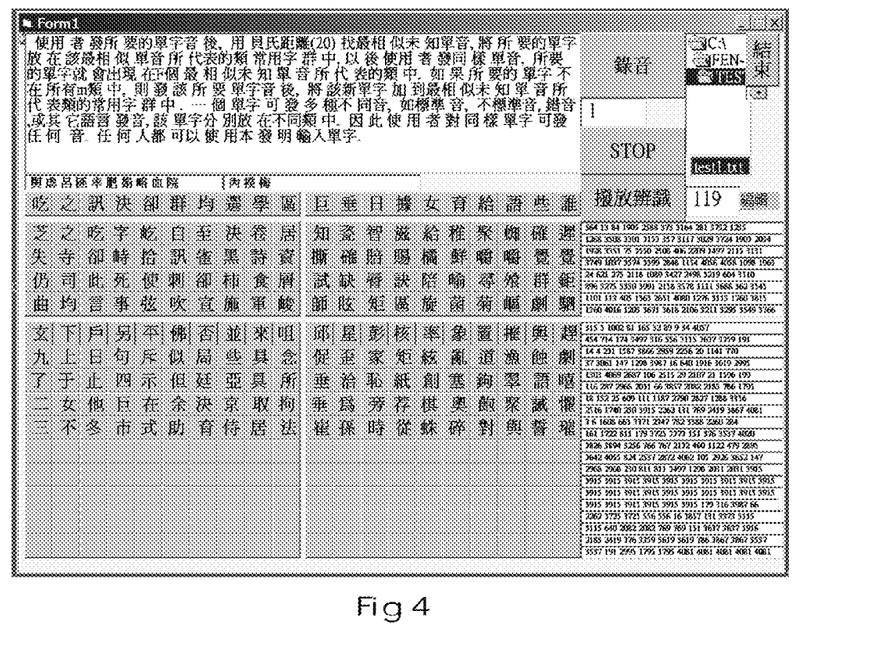
Figure 5:
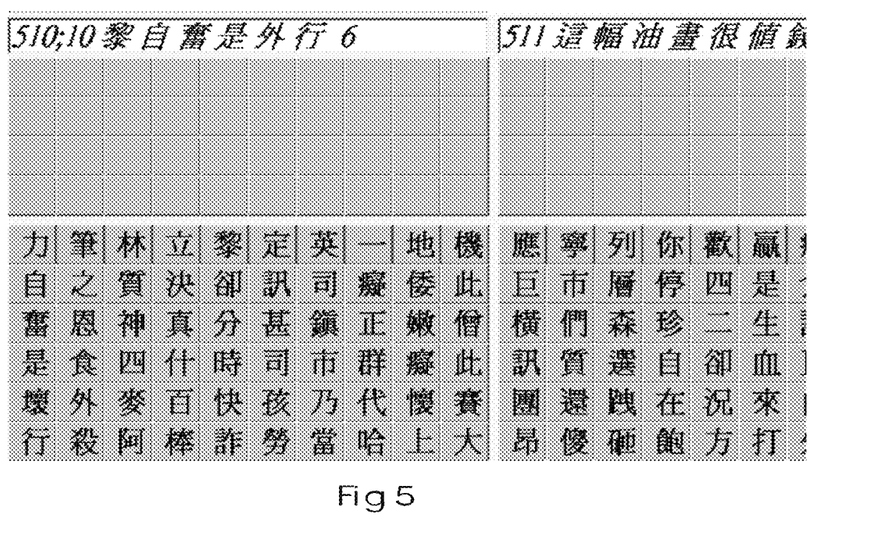
FIGS. 5-9 shows speech recognition on 2 Chinese sentences and 3 English sentences.
Figure 6:
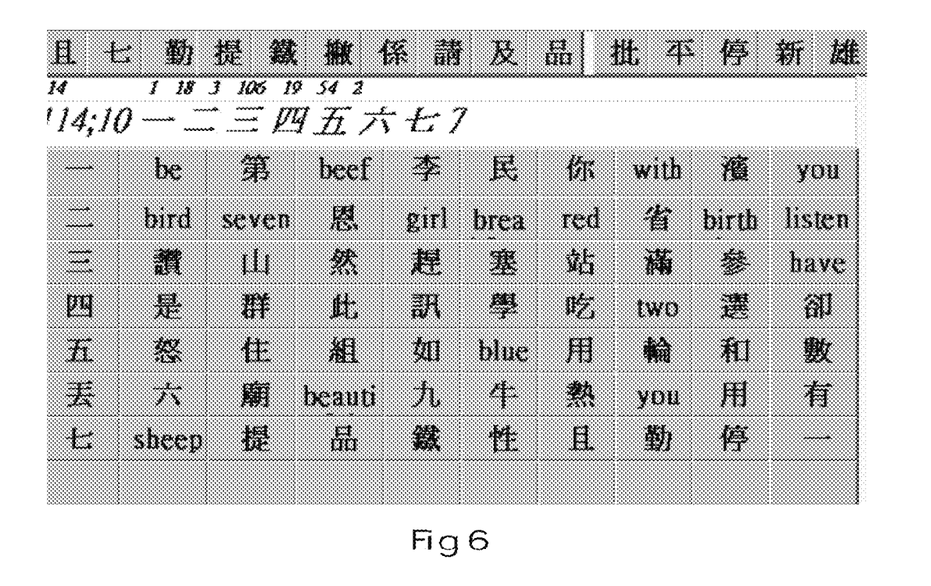
Figure 7:
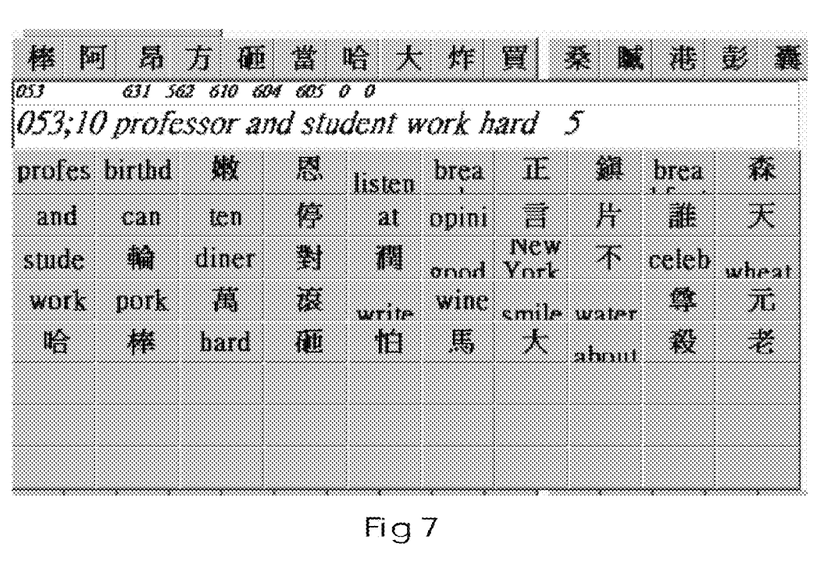
Figure 8:
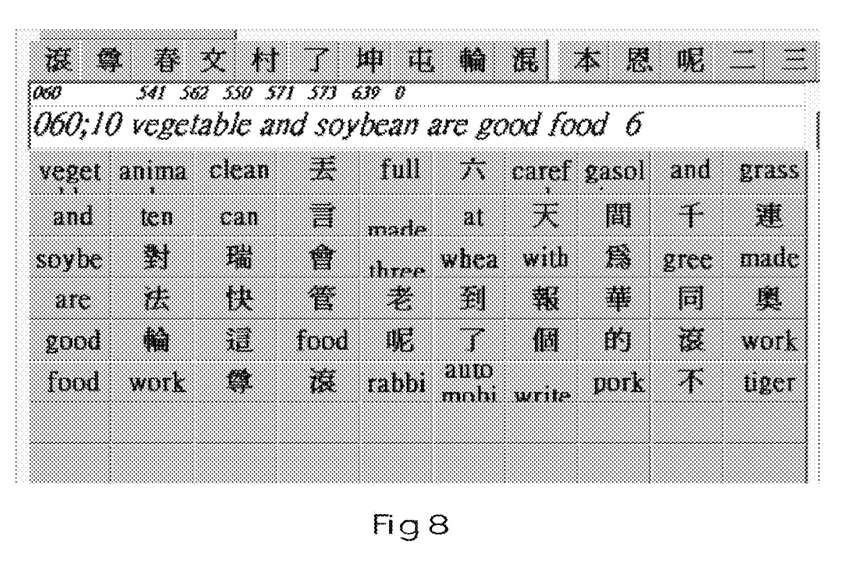
Figure 9:
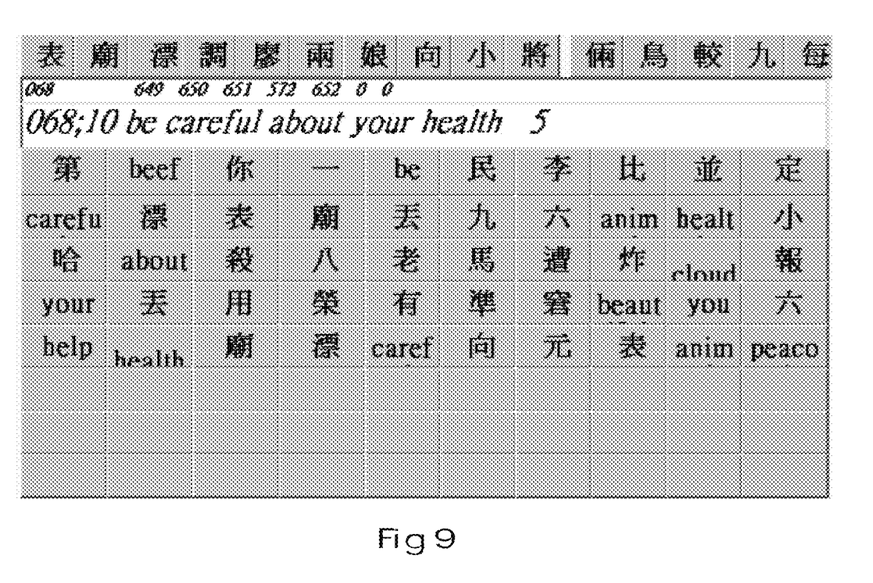

12. The inventors collect 3775 commonly-used Chinese characters and many of them are repeated, since the inventors don't have any support to the invention. 3775 Chinese characters are classified by the invention into 659 categories represented by 659 unknown voices. More than 90% of Chinese Characters are successfully recognized and input into computer. After the invention uses the skill in 10, all Chinese characters can be input. The book of this invention (except mathematical formula) in the Chinese version is input by the present invention using speech. FIGS. 3-4 shows part of the contents of the present invention in Chinese version. The inventors also collect 155 English words and 659 Chinese characters, which are classified by the invention into 388 categories represented by 388 unknown voices. 155 English words and 659 Chinese words make 70 English sentences and 561 Chinese sentences and names both co-existed in the same database. They all can be recognized by the invention. Most of pronounced words in the sentences are shown on the top (left-handed side). FIGS. 4-9 shows speech recognition on 1 Chinese sentence, 1 sequence of numbers in Chinese and 3 English sentences.

What is claimed is:

1. A method for speech recognition on all languages and for inputting words, wherein a word is language independent and an unknown voice provides pronunciation of an unknown word, wherein m unknown voices having samples and a database of commonly-used known words not having samples is used, the method comprising:

(a) using a pre-processor to delete noise and the time interval without speech signal;

(b) normalizing the whole speech waveform of an unknown voice (or a word), using E equal elastic frames (windows) without filter and without overlap and to transform the waveform into an equal-sized E×P matrix, such that E is equal to P, of the linear predict coding cepstra (LPCC) such that the same unknown voices (or words) have about the same LPCC at the same time position in their equal-sized E×P matrices of LPCC;

(c) for each unknown voice of m unknown voices, finding the sample mean and variance of linear predict coding cepstra (LPCC), a E×P matrix of sample means and variances representing an unknown voice and an unknown voice representing a category of known words with similar pronunciation to the unknown voice;

(d) pronouncing with a speaker standard and clear utterance pronunciations of all words in the database wherein if the user pronunciations use different languages or dialects or with special accents, letting the user pronounce all the words;

(e) normalizing the whole speech waveform of a pronounced word, using E equal elastic frames (windows) without filter and without overlap to transform the waveform into an equal-sized E×P matrix of linear predict coding cepstra (LPCC);

(f) comparing with a simplified Bayesian classifier the E×P matrix of linear predict coding cepstra (LPCC) of the pronounced word and using Bayesian distance (similarity) to find the most similar unknown voice to the pronounced word, the pronounced word being put into the category of known words represented by its most similar unknown voice, all pronounced words being classified into m categories of known words, each category containing known words with similar pronunciations, wherein a pronounced word may be classified into several categories;

(g) pronunciation by a user of a word, which is transformed into a E×P matrix of linear predict coding cepstra (LPCC);

(h) finding with the simplified Bayesian classifier the F most similar unknown voices for the pronounced word, wherein the simplified Bayesian classifier uses the F least Bayesian distances (similarities) to the pronounced word to find the F most similar unknown voices;

(i) representing all known words from F categories, wherein the F most unknown voices are arranged in a decreasing similarity according to their (absolute) distances (similarities) of the E×P matrices of LPCC of the known words from F categories to the matrix of LPCC of the pronounced word;

(j) arranging all known words into F categories in a decreasing similarity and partitioning them into several equal segments, wherein each segment of known words is arranged in a line according to their alphabetic letters or the number of strokes of Chinese character, wherein all known words in F categories are arranged into a matrix according to their pronunciation similarity to the pronounced word and their alphabetic letters, the pronounced word being found in the matrix by using the pronunciation similarity and the alphabetic letters or number of strokes in Chinese;

(k) recognizing a sentence or name within the voice;

(l) recognizing unsuccessful words, unsuccessful sentences or names and providing help to input words;

(m) representing the sample means and variances of m unknown voices using constants, which are independent of languages, accents, person and sex; and (n) using the Bayesian classifier to classify the word into several categories, using any language-independent word or any accent or any dialect to pronounce the word, even if pronounced incorrectly or completely wrong.

2. The method of claim 1, wherein step (h) further includes a simplified Bayesian classifier to compare the E×P matrix of samples means and variances of LPCC of an unknown voice with the E×P matrix of linear predict coding cepstra (LPCC) of the pronounced word, further comprising:

wherein a pronounced word is represented by a E×P matrix of linear predict coding cepstra (LPCC), represented by $X=\{X_{jl}\}$, $j=1,\ldots,E$, $l=1,\ldots,P$;

wherein E×P and $\{X_{jl}\}$ are independent and have normal distributions;

wherein if the pronounced word is compared with an unknown voice $\omega_i$, $i=1,\ldots,m$, then $\{X_{jl}\}$ has the means and variances $(\mu_{ijl}, \sigma^2_{ijl})$ which are estimated by the sample means and sample variances of the samples of $\omega_i$;

wherein the density of X is $$f(x|\omega_i) = \left[\prod_{jl} \frac{1}{\sqrt{2\pi}\,\sigma_{ijl}}\right] e^{-\frac{1}{2}\sum_{jl}\left(\frac{x_{jl}-\mu_{ijl}}{\sigma_{ijl}}\right)^2}$$

where $X=\{X_{jl}\}$ is the E×P matrix of LPCC of the pronounced word;

wherein the simplified Bayesian classifier is sued to match the pronounced word with all unknown voices;

wherein if the based on the Bayesian decision rule, if the priors of m unknown voices are equal, the similarity between a pronounced word $X=\{X_{jl}\}$ and an unknown voice $\omega_i$ is computed by the density $f(x|\omega_i)$, $$f(x|\omega_i) = \left[\prod_{jl} \frac{1}{\sqrt{2\pi}\,\sigma_{ijl}}\right] e^{-\frac{1}{2}\sum_{jl}\left(\frac{x_{jl}-\mu_{ijl}}{\sigma_{ijl}}\right)^2};$$

wherein after taking the logarithmic value of $f(x|\omega_i)$ and deleting unnecessary constants, the similarity is measured by a Bayesian distance (also called a Bayesian classifier and similarity) $l(\omega_i)$, $$l(\omega_i) = \sum_{jl} \ln(\sigma_{ijl}) + \frac{1}{2}\sum_{jl}\left(\frac{x_{jl}-\mu_{ijl}}{\sigma_{ijl}}\right)^2;$$

wherein for each unknown voice $\omega_i$, $i=1,\ldots,m$, the Bayesian distance $l(\omega_i)$ from the pronounced word X to the unknown voice $\omega_i$ is computed;

wherein the Bayesian classifier selects the most similar unknown voice $\omega_i$ among m unknown voices, using the shortest Bayesian distance $l(\omega_i)$ (the largest similarity) to the pronounced word X, the pronounced word X being classified into the category represented by the most similar unknown voice $\delta_i$.

3. The method of claim 1, wherein step (k) of recognizing a sentence or name within the voice further comprises the steps of:
- (k1) representing a sentence or name by a long sequence of speech sampled points, in a unit time interval, wherein the total sum of distances between any two consecutive points is computed, wherein if the total sum is less than the total sum of noise, the unit time interval does not have a speech signal, and wherein if the unit time intervals without speech signal are accumulated to an amount more than the time between two syllables in a word it is determined to be a border between two pronounced words (a Chinese syllable being considered as a word with one syllable), the sentence or name is partitioned into D pronounced words;
- (k2) finding the sentence or name uttered by a speaker in the sentence and name database, wherein since a pronounced word may be partitioned into two words, in the sentence and name database, picking up the matching sentences or names with D−1, D and D+1 known words for matching the sentence or name uttered by the user;
- (k3) for each of D pronounced words, finding its F most similar unknown voices using the Bayesian classifier, and the F E×P matrices of means and variances having the F shortest Bayesian distances to the E×P matrix of LPCC representing the pronounced word, a sentence or name being represented by a D×F matrix of unknown voices;
- (k4) for each pronounced word, arranging all known words from F categories represented by its F most similar unknown voices in a decreasing similarity according to their absolute distances (pronunciation similarity) of the matrices of LPCC of the known words from F categories to the matrix of LPCC of the pronounced word, there being D lines of decreasingly similar known words which contain the sentence or name uttered by the user;
- (k5) if a matching sentence or name in the sentence and name database exactly D known words, then matching each known word of the matching sentence or name with each line of decreasingly similar known words of D lines in a row order from the first row to the last row, if each row of decreasingly similar known words contains its corresponding known word of the matching sentence or name, then a number of D pronounced words being recognized correctly as the sentence or name uttered by the speaker;
- (k6) if a matching sentence or name in the sentence and name database does not have the exact number of D pronounced words, or if in (k5) at least one line of decreasingly similar known words does not have a known word or the matching sentence or name, using a screen window of 3 consecutive lines of decreasingly similar known words to find the sentence or name, and the (i−1)-th, i-th and (i+1)-th lines of decreasingly similar known words in the screen window checks the i-th known word of the matching sentence or name and computing the probability (the number of known words of the matching sentence or name in the screen window divided by total number of words in the matching sentence or name), wherein a matching sentence or name in the sentence and name database with the highest probability to be the sentence or name uttered by the user is selected.

4. The method of claim 1, wherein step (l) of recognizing unsuccessful words, unsuccessful sentences or names and providing help to input words further comprises:
- (l1) if a pronounced word cannot be recognized, then determining whether the pronounced word is not in F categories represented by its F most similar unknown voices or not in all m categories;
- (l2) if a pronounced word is not in the F categories represented by its F most similar unknown voices, receiving from the user a pronunciation of the unsuccessful word again, finding it most similar unknown voice, and relocating the pronounced word into its proper category represented by the most similar unknown voice, and recognizing the pronounced word and input correctly;
- (l3) if the pronounced word is not in all m categories, receiving from the user a pronunciation of the new word again, and finding its most similar unknown voice wherein the new pronounced word is added to the category represented by the most similar unknown voice;
- (l4) if a sentence or a name is not recognized, receiving from the user an utterance of the sentence or name again, partitioning the sentence or name into D pronounced words, finding the most similar unknown voice for each pronounced word, relocating the pronounced word into its proper category represented by its most similar unknown voice and then correctly recognizing the sentence or name;
- (l5) only relocating unsuccessful words into another category, and not changing any features (sample means and variances) of m unknown voices as the sample means and variances of m unknown voices are considered to be constants, which are independent of languages, accents, persons and sex, wherein the recognition method is stable for all users.

* * * * *